US011808966B2

(12) United States Patent
Nakabayashi et al.

(10) Patent No.: US 11,808,966 B2
(45) Date of Patent: Nov. 7, 2023

(54) LIGHT-EMITTING MODULE

(71) Applicant: NICHIA CORPORATION, Anan (JP)

(72) Inventors: Takuya Nakabayashi, Tokushima (JP); Daisuke Kasai, Tokushima (JP); Takao Nakauchi, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/166,356

(22) Filed: Feb. 8, 2023

(65) Prior Publication Data
US 2023/0194766 A1    Jun. 22, 2023

Related U.S. Application Data

(63) Continuation of application No. 17/305,185, filed on Jul. 1, 2021, now Pat. No. 11,598,913.

(30) Foreign Application Priority Data

Jul. 1, 2020    (JP) .................................. 2020-113886

(51) Int. Cl.
*F21V 8/00*    (2006.01)
(52) U.S. Cl.
CPC ......... *G02B 6/0038* (2013.01); *G02B 6/0055* (2013.01); *G02B 6/0068* (2013.01)
(58) Field of Classification Search
CPC ... G02B 6/0038; G02B 6/0055; G02B 6/0068
See application file for complete search history.

(56) References Cited

U.S. PATENT DOCUMENTS

| | | | |
|---|---|---|---|
| 8,301,002 B2 | 10/2012 | Shani | |
| 2005/0265029 A1 | 12/2005 | Epstein et al. | |
| | (Continued) | | |

FOREIGN PATENT DOCUMENTS

| | | |
|---|---|---|
| JP | 2008059786 A | 3/2008 |
| JP | 2010008837 A | 1/2010 |
| | (Continued) | |

OTHER PUBLICATIONS

USPTO, Non-final office action issued in U.S. Appl. No. 17/305,185 dated Aug. 30, 2022, 9 pages.
(Continued)

*Primary Examiner* — Andrew J Coughlin
*Assistant Examiner* — Jessica M Apenteng
(74) *Attorney, Agent, or Firm* — HUNTON ANDREWS KURTH LLP

(57) ABSTRACT

A light-emitting module includes: a plurality of light sources; and a lightguide plate including a plurality of light source placement sections, in each of which at least one light source is arranged, arrayed in a first direction and a second direction orthogonal to the first direction. The lightguide plate defines at least one first-A light control groove and at least one first-B light control groove that extend parallel to the second direction between a first light source placement section and a second light source placement section adjacent to the first light source placement section in the first direction, and at least one second-A light control groove and at least one second-B light control groove that extend parallel to the first direction between the first light source placement section and a third light source placement section adjacent to the first light source placement section in the second direction.

19 Claims, 11 Drawing Sheets

(56) References Cited

U.S. PATENT DOCUMENTS

| | | |
|---|---|---|
| 2009/0290093 A1 | 11/2009 | Shimura et al. |
| 2011/0149594 A1 | 6/2011 | Terajima et al. |
| 2012/0013811 A1 | 1/2012 | Shimizu |
| 2018/0239076 A1* | 8/2018 | Chen .................. G02B 6/0068 |
| 2018/0314110 A1 | 11/2018 | Chen et al. |
| 2018/0335559 A1 | 11/2018 | Cho |
| 2018/0356685 A1* | 12/2018 | Jang ................. G02F 1/133603 |
| 2019/0278013 A1* | 9/2019 | Huang ................ G02B 6/0023 |
| 2019/0294005 A1* | 9/2019 | Imada ................ G02B 6/0026 |
| 2020/0049877 A1 | 2/2020 | Watanabe et al. |
| 2020/0194642 A1* | 6/2020 | Nakauchi ............. G02B 6/0016 |
| 2022/0003915 A1 | 1/2022 | Nakabayashi et al. |

FOREIGN PATENT DOCUMENTS

| | | |
|---|---|---|
| JP | 2010055999 A | 3/2010 |
| JP | 2010102905 A | 5/2010 |
| JP | 2011204566 A | 10/2011 |
| JP | 2013029573 A | 2/2013 |
| JP | 2014113828 A | 6/2014 |
| JP | 2018101521 A | 6/2018 |
| JP | 2018190708 A | 11/2018 |
| JP | 2019530967 A | 10/2019 |
| KR | 20090117419 A | 11/2009 |
| WO | 2010113361 A1 | 10/2010 |
| WO | 2018116815 A1 | 6/2018 |

OTHER PUBLICATIONS

USPTO, Notice of Allowance issued in U.S. Appl. No. 17/305,185 dated Nov. 8, 2022, 8 pages.

* cited by examiner

LIGHT-EMITTING MODULE

CROSS REFERENCE TO RELATED APPLICATION

This is a continuation application of U.S. patent application Ser. No. 17/305,185, filed Jul. 1, 2021, which claims priority to Japanese Patent Application No. 2020-113886, filed on Jul. 1, 2020, the disclosure of which is hereby incorporated by reference in its entirety.

BACKGROUND

The present disclosure relates to a light-emitting module.

A light-emitting module using a light source and a light-guide plate is used for a backlight device for a liquid crystal display device (see, for example, Japanese Patent Publication No. 2008-59786). For such light-emitting modules, a technique has been developed, in which a light-emitting surface is demarcated into a plurality of light-emitting regions and brightness is controlled for each light-emitting region.

SUMMARY

With such light-emitting modules, there is a demand for further improving the contrast ratio between lit areas and non-lit areas.

A light-emitting module according to one embodiment includes: A light-emitting module includes: a plurality of light sources; and a lightguide plate including a first surface, a second surface opposite to the first surface, and a plurality of light source placement sections arrayed in a first direction and a second direction orthogonal to the first direction, at least one of the plurality of light sources being arranged in each of the plurality of light source placement sections. The plurality of light sources are located at a side of the second surface. The plurality of light source placement sections include a first light source placement section, a second light source placement section that is adjacent to the first light source placement section in the first direction, and a third light source placement section that is adjacent to the first light source placement section in the second direction. The lightguide plate defines at least one first-A light control groove and at least one first-B light control groove that extend parallel to the second direction between the first light source placement section and the second light source placement section, and at least one second-A light control groove and at least one second-B light control groove that extend parallel to the first direction between the first light source placement section and the third light source placement section.

According to certain embodiments of the present disclosure, it is possible to provide a light-emitting module with which it is possible to improve the contrast ratio between lit areas and non-lit areas.

DETAILED DESCRIPTION

Figure 1:
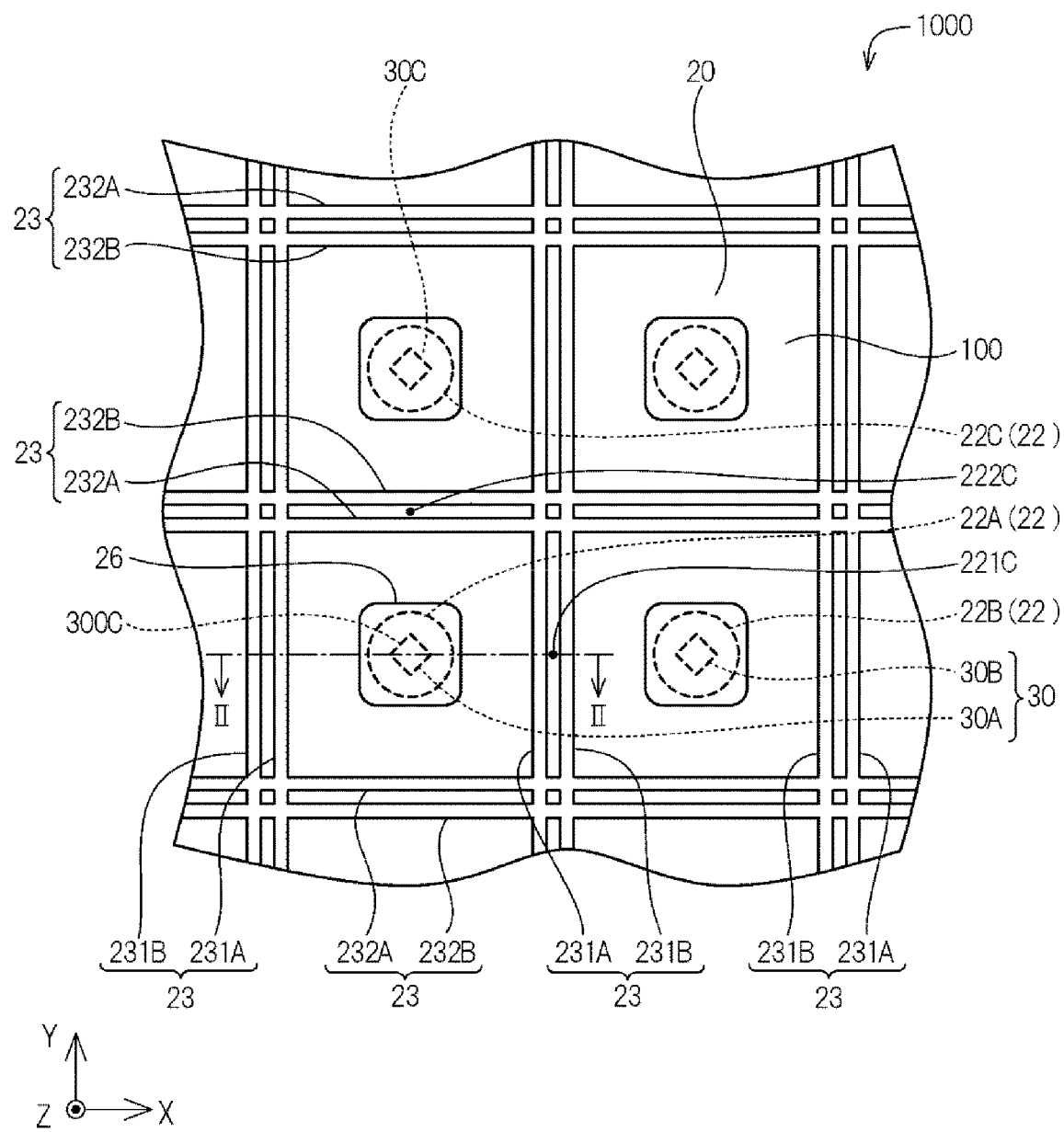
FIG. 1 is a schematic top view showing an example of a surface light source according to a first embodiment of the present disclosure.

Embodiments of the present disclosure will be described in detail with reference to the drawings. The following embodiments are illustrative, and a surface light source and a light-emitting module according to the present disclosure are not limited to the embodiments described below. For example, the numerical values, shapes, materials, etc., to be shown in the embodiments described below are merely examples, and various modifications can be made thereto as long as they do not result in technical contradictions. The embodiments to be described below are merely illustrative, and various combinations are possible as long as they do not result in technical contradictions.

The size, the shape, etc., of the components shown in the figures may be exaggerated for the ease of understanding, and they may not represent the size and the shape of the components, the size relationship therebetween in an actual surface light source or light-emitting module. In order to prevent the figures from becoming excessively complicated, some components may be omitted, and a cross-sectional end view that shows only a cross section may be used as a cross-sectional view.

In the following description, components of like functions may be denoted by like reference signs and may not be described redundantly. Terms indicating specific directions and positions (e.g., "upper", "lower", and other terms including such terms) may be used. These terms are used merely for ease of understanding relative directions or positions in the figure being referred to. The arrangement of components in drawings of documents other than the present disclosure, actual products, etc., does not need to be equal to that shown in the figure being referred to, as long as it conforms with the directional or positional relationship as indicated by terms such as "upper" and "lower" in the figure being referred to. In the present specification, the term "parallel" encompasses cases where two straight lines, sides, planes, etc., are in the range of about 0±5°, unless otherwise specified. In the present specification, the term "orthogonal" or "perpendicular" encompasses cases where two straight lines, sides, planes, etc., are in the range of approximately 90±5°, unless otherwise specified. Moreover, the positional relationship represented as "on/above" encompasses an object being in contact with another object and an object being not in contact with but positioned above another object.

First Embodiment

An illustrative surface light source 1000 according to the present embodiment will be described with reference to FIG. 1 to FIG. 5. The surface light source 1000 includes a light-emitting module 100 and a wiring board 200. The light-emitting module 100 includes a plurality of light sources 30 and a lightguide plate 20. The light-emitting module 100 may further include an adhesive sheet 205 and a light-reflecting sheet 206. The lightguide plate 20 is arranged on the wiring board 200, and the plurality of light sources 30 are arranged on the wiring board 200. The wiring board 200 may be further provided with a first insulating layer 208A and a second insulating layer 208B. The adhesive sheet 205 and the light-reflecting sheet 206 are arranged between the wiring board 200 and the lightguide plate 20. The adhesive sheet 205 bonds the lightguide plate 20 and the light-reflecting sheet 206 together. For the adhesive sheet 205, for, example, an Optical Clear Adhesive (OCA), can be used. The light-emitting module 100 may include an adhesive sheet that bonds together the wiring board 200 and the light-reflecting sheet 206. The light-reflecting sheet 206 reflects a portion of light emitted from the light source 30. The first insulating layer 208A and the second insulating layer 208B cover a lower surface of the wiring board 200. The first insulating layer 208A protects the lower surface of the wiring board 200 from the external environment. The second insulating layer 208B prevents electrical short-circuiting of a terminal 209 of the wiring board 200 located on the lower surface of the wiring board 200, and protects the lower surface of the wiring board 200 from the external environment.

Figure 2:
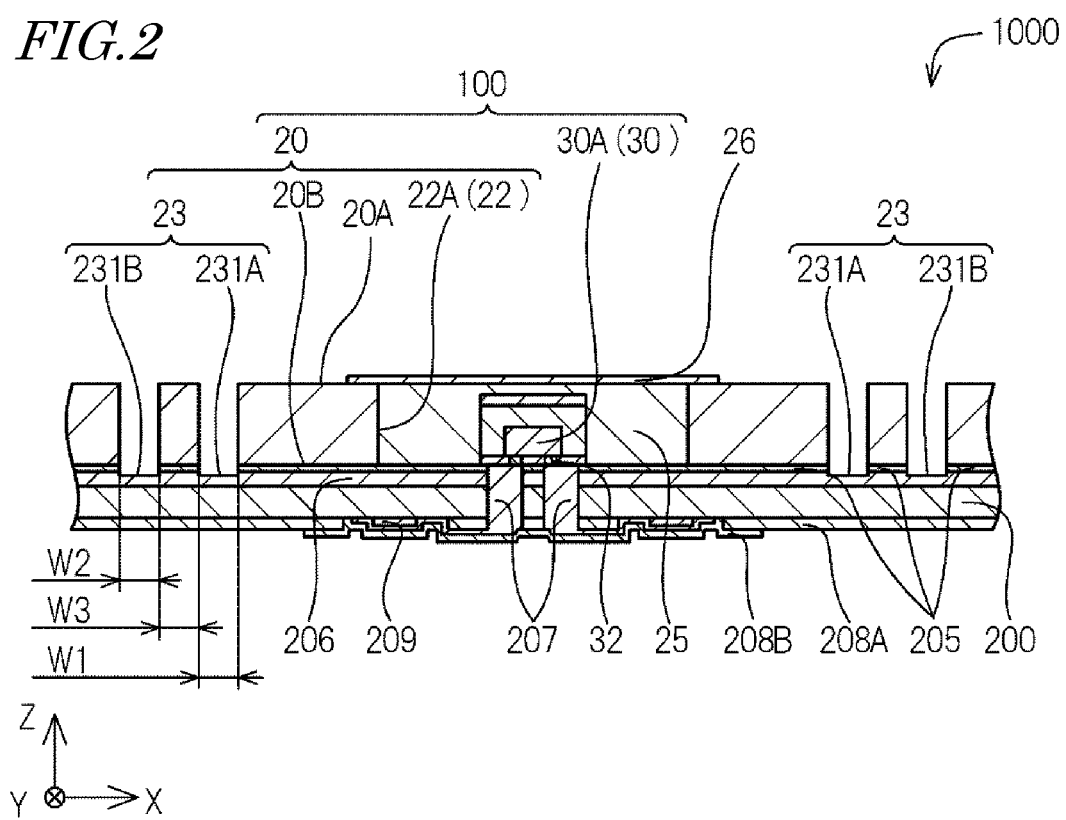
FIG. 2 is a schematic cross-sectional view taken along line II-II of FIG. 1, showing the example of the surface light source according to the first embodiment.

The wiring board 200 is a member that electrically connects the plurality of light sources 30. For example, as shown in FIG. 2, the wiring board 200, the adhesive sheet 205 and the light-reflecting sheet 206 define through holes, and a wiring 207 is disposed in each of the through holes. One end portion of each wiring 207 is in contact with an external electrode member of a light source, and another end portion of each wiring 207 is connected to a terminal 209 located on the lower surface of the wiring board 200. Thus, the wiring board 200 is electrically connected to the plurality of light sources 30.

The light-reflecting sheet 206 preferably overlaps with the light source 30 in a top plan view. With this structure, light from the light source 30 is more easily reflected at the light-reflecting sheet 206. This allows for improving the efficiency of light extraction from the light source 30. The light-reflecting sheet 206 preferably overlaps with the outer edge of the light source placement section to be described below in a top plan view. The light-reflecting sheet 206 more preferably overlaps with the outer edge of the light-emitting region to be described below in a top plan view. This allows for further improving the efficiency of light extraction from the light source 30.

For the light-reflecting sheet 206, a resin sheet containing a large number of bubbles (e.g., a foamed resin sheet), a resin sheet containing a light-diffusing material, or the like can be used. Examples of a resin used for the light-reflecting sheet 206 include a thermoplastic resin such as an acrylic resin, a polycarbonate resin, a cyclic polyolefin resin, a polyethylene terephthalate resin or a polyester resin, and a thermosetting resin such as an epoxy resin or a silicone resin. A known material such as titanium oxide, silica, alumina, zinc oxide or glass may be used for the light-diffusing material.

The light-emitting module 100 includes the plurality of light sources 30 and the lightguide plate 20. The lightguide plate 20 includes a first surface 20A, a second surface 20B, and a plurality of light source placement sections 22, and defines light control grooves 23. The light control grooves 23 include first-A light control grooves 231A, first-B light control grooves 231B, second-A light control grooves 232A and second-B light control grooves 232B. The second surface 20B is located opposite to the first surface 20A. The plurality of light sources 30 is located on a second surface 20B side. At least one of the plurality of light sources 30 is disposed in each of the plurality of light source placement sections 22. The plurality of light source placement sections 22 are arranged in an array extending in the first direction and the second direction orthogonal to the first direction. The plurality of light source placement sections 22 include a first light source placement section 22A, a second light source placement section 22B that is adjacent to the first light source placement section 22A in the first direction, and a third light source placement section 22C that is adjacent to the first light source placement section 22A in the second direction. One of the first-A light control groove 231A and one of the first-B light control grooves 231B extend parallel to the second direction between the first light source placement section 22A and the second light source placement section 22B. One of the second-A light control grooves 232A and one of the second-B light control grooves 232B extend parallel to the first direction between the first light source placement section 22A and the third light source placement section 22C. In FIG. 1, the first direction is the X direction, and the second direction is the Y direction.

In the present specification, the expression "a light control groove extending in the first direction or the second direction" means that two opposite sides of a light control groove 23 that define outer edges of the light control groove 23 are parallel to the first direction or the second direction. For example, the expression "the first-A light control groove 231A extending parallel to the second direction" means that two opposite sides of a first-A light control groove 231A that define outer edges of the first-A light control groove 231A are parallel to the second direction. The light source disposed in the first light source placement section 22A may be referred to as a "first light source 30A", a light source disposed in the second light source placement section 22B may be referred to as a "second light source 30B", and a light source disposed in the "third light source placement section 22C" may be referred to as a third light source 30C.

The lightguide plate 20 is a light-transmitting member that allows light emitted from the light source 30 arranged in the light source placement section to propagate therethrough and to be emitted from the first surface 20A of the lightguide plate 20. The lightguide plate 20 may be constituted of a single layer or may have a layered structure in which a plurality of layers are layered. When using the lightguide plate 20 having a layered structure in which a plurality of layers are layered, for example, a layered lightguide plate in which two lightguide plates are bonded together by an adhesive sheet may be employed. Examples of materials that may be used for the lightguide plate 20 include a thermoplastic resin such as an acrylic resin, a polycarbonate resin, a cyclic polyolefin resin, a polyethylene terephthalate resin or a polyester resin, a thermosetting resin such as an epoxy resin or a silicone resin, and glass, etc. The lightguide plate 20 preferably has a thickness of 200 µm or more and 800 µm or less, for example.

As shown in FIG. 1, each first-A light control groove 231A and a corresponding first-B light control groove 231B are located between corresponding adjacent ones of the plurality of light source placement sections 22 in the first direction (the X direction). A first-A light control groove 231A is located closer to the first light source placement section 22A than a corresponding first-B light control groove 231B in the first direction. The first light source placement section 22A is located between a corresponding pair of first-A light control grooves 231A that are adjacent to each other in the first direction. A first-B light control groove 231B is located closer to the second light source placement section 22B than a corresponding first-A light control groove 231A in the first direction. The second light source placement section 22B is located between a corresponding pair of first-B light control grooves 231B that are adjacent to each other in the first direction.

As shown in FIG. 1, each second-A light control groove 232A and a corresponding second-B light control groove 232B are located between corresponding adjacent ones of the plurality of light source placement sections 22 in the second direction (the Y direction). A second-A light control groove 232A is located closer to the first light source placement section 22A than a corresponding second-B light control groove 232B in the second direction. The first light source placement section 22A is located between a corresponding pair of second-A light control grooves 232A that are adjacent to each other in the second direction. A second-B light control groove 232B is located closer to the third light source placement section 22C than a corresponding second-A light control groove 232A in the second direction. The third light source placement section 22C is located between a corresponding pair of second-B light control grooves 232B that are adjacent to each other in the second direction.

Figure 3:
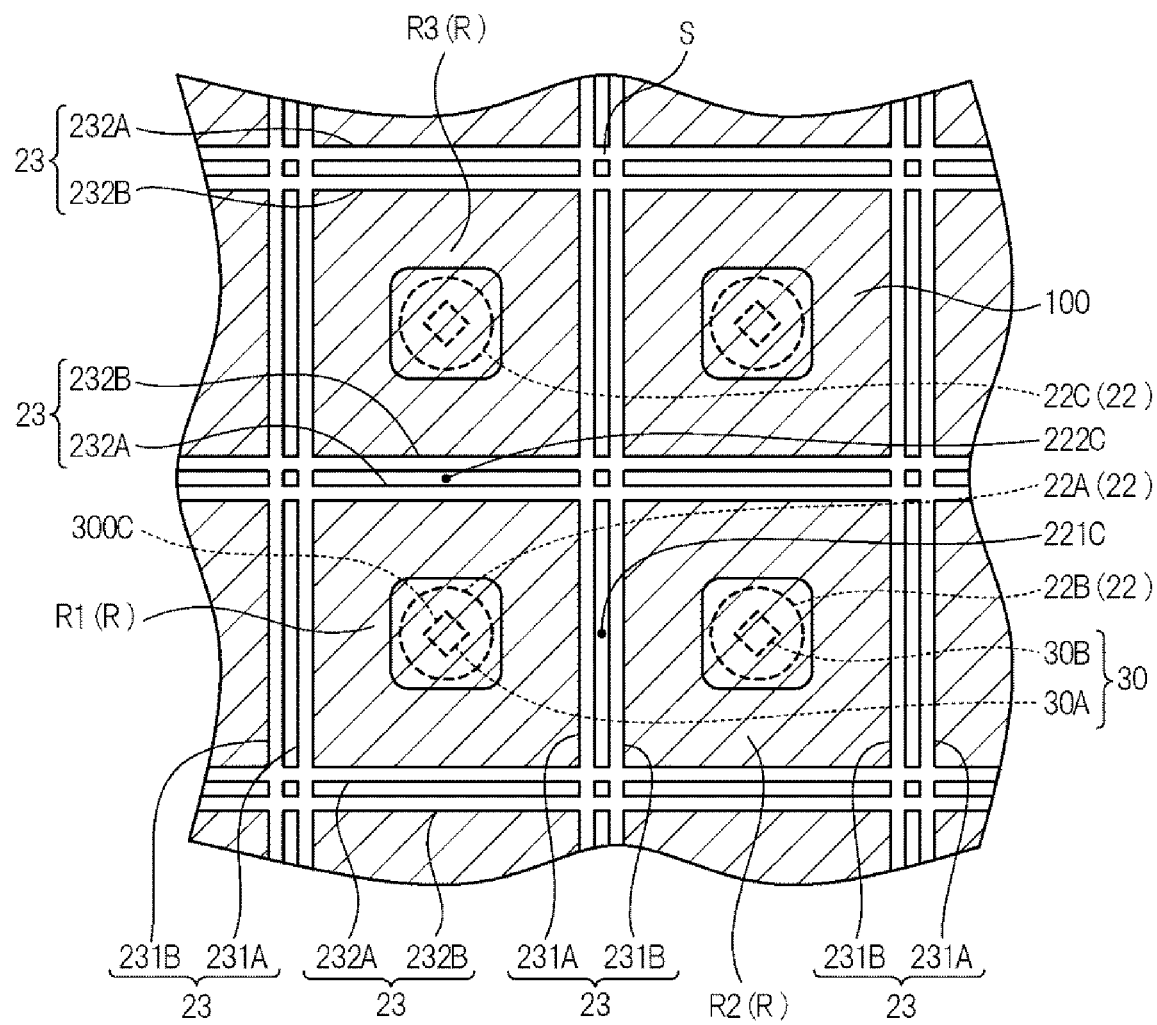
FIG. 3 is a schematic top view showing light-emitting regions of the example of the surface light source according to the first embodiment.

A region that is surrounded by light control grooves 23 that are located close to a light source placement section 22 is referred to as a "light-emitting region R". Each hatched region in FIG. 3 represents a light-emitting region R. For example, the "light-emitting region R corresponding to the first light source placement section 22A" refers to a region that is surrounded by corresponding first-A light control grooves 231A and corresponding second-A light control grooves 232A. The "light-emitting region R corresponding to the second light source placement section 22B" refers to a region that is surrounded by corresponding first-B light control grooves 231B and corresponding second-A light control grooves 232A. The "light-emitting region R corresponding to the third light source placement section 22C" refers to a region that is surrounded by corresponding first-A light control grooves 231A and corresponding second-B light control grooves 232B. It is not necessary that the entire periphery of a light-emitting region R be surrounded by light control grooves 23. Each light-emitting region R is defined to not include light control grooves 23. The light-emitting region corresponding to a first light source placement section 22A may be referred to as a "first light-emitting region R1", the light-emitting region corresponding to a second light source placement section 22B may be referred to as a "second light-emitting region R2", and the light-emitting region corresponding to a third light source placement section 22C as a "third light-emitting region R3".

The lightguide plate 20 has a demarcating region(s) S in a region other than the light emitting regions R in a top plan view. The demarcating region S includes first regions each located between a corresponding first-A light control groove 231A and a corresponding first-B light control groove 231B that are adjacent to each other in the first direction, and second regions each located between a corresponding second-A light control groove 232A and a corresponding second-B light control groove 232B in the second direction. Note that it is not necessary that the entire peripheries of the first and second regions be surrounded by light control grooves 23. A demarcating region S is defined to include light control grooves 23 and not include light-emitting regions R. A portion of light from the light source preferably enters the demarcating region S. With this structure, it is possible to prevent the demarcating region from becoming excessively dark.

With the lightguide plate 20 defining the first-A light control groove 231A and the first-B light control groove 231B extending parallel to the second direction between the first light source placement section 22A and the second light source placement section 22B, a portion of light that travels in the first direction from the first light source 30A disposed in the first light source placement section 22A is refracted or reflected by the first-A light control groove 231A and/or the first-B light control groove 231B. That is, a portion of light that travels in the first direction from the first light source 30A is refracted or reflected by the first-A light control groove 231A. A portion of light from the first light source 30A that passes through the first-A light control groove 231A and travels in the first direction is refracted or reflected by the first-B light control groove 231B. Thus, it is possible to prevent a portion of light that travels in the first direction from the first light source 30A from entering the second light-emitting region R2. In the present embodiment, the lightguide plate 20 defines two grooves, i.e., the first-A light control groove 231A and the first-B light control groove 231B, between the first light source placement section 22A and the second light source placement section 22B, it is possible to better prevent a portion of light that travels in the first direction from the first light source 30A from entering the second light-emitting region R2. This allows for improving the contrast ratio between the first light-emitting region R1 and the second light-emitting region R2 when the first light source 30A is lit and the second light source 30B is not lit, it is possible to. Similarly, it is possible to prevent light from the second light source 30B from entering the first light-emitting region R1 when the second light source 30B is lit and the first light source 30A is not lit.

With the lightguide plate 20 including the second-A light control groove 232A and the second-B light control groove 232B extending parallel to the first direction between the first light source placement section 22A and the third light source placement section 22C, a portion of light that travels in the second direction from the first light source 30A is refracted or reflected by the second-A light control groove 232A and/or the second-B light control groove 232B. That is, a portion of light that travels in the second direction from the first light source 30A is refracted or reflected by the second-A light control groove 232A. A portion of light from the first light source 30A that passes through the second-A light control groove 232A and travels in the second direction is refracted or reflected by the second-B light control groove 232B. This allows for preventing a portion of light that travels in the second direction from the first light source 30A from entering the third light-emitting region R3. Accordingly, it is possible to improve the contrast ratio between the first light-emitting region R1 and the third light-emitting region R3 when the first light source 30A is lit and the third light source 30C is not lit. Similarly, it is possible to prevent light from the third light source 30C from entering the first light-emitting region R1 when the third light source 30C is lit and the first light source 30A is not lit.

The light control grooves 23 of the lightguide plate 20 may be through holes that are open in the first surface 20A and the second surface 20B, may be recesses that are open in the second surface 20B and are apart from the first surface 20A, or may be recesses that are open in the first surface 20A and are apart from the second surface 20B. In the present specification, the term "grooves" includes such recesses and through holes. That is, the term "grooves" in the present specification refer both to recesses that do not extend through the body (e.g., the lightguide plate 20) in which the grooves are formed and to through holes that run therethrough. As shown in FIG. 2, the two opposing sides of a groove in a cross-sectional view may extend parallel to the Z direction, or the two opposing sides of a groove may be inclined from the Z direction. When the two opposing sides of a groove are inclined from the Z direction, the shape of the groove in a cross-sectional view may be a V-shape or may be a trapezoidal shape. The outer edge of a groove may be curved in a cross-sectional view.

In the present embodiment, the first-A light control groove 231A, the first-B light control groove 231B, the second-A light control groove 232A and the second-B light control groove 232B are through holes that are open in the first surface 20A and the second surface 20B of the lightguide plate 20. With the first-A light control groove 231A is open in the first surface 20A, light from the first light source 30A can more easily be emitted to the outside of the lightguide plate 20 from the first surface 20A of the lightguide plate 20. Thus, it is possible to prevent light from the first light source 30A from entering the second light-emitting region R2, which allows for improving the contrast ratio between the first light-emitting region R1 and the second light-emitting region R2. Similarly, with the first-B light control groove 231B, the second-A light control groove 232A and/or the second-B light control groove 232B that are open in the first surface 20A, it is possible to improve the contrast ratio between adjacent light-emitting regions.

When the first-A light control groove 231A is a through hole that is open in the first surface 20A and the second surface 20B, increase of the surface area of the lightguide plate 20 in the first-A light control groove 231A can be facilitated. Thus, light from the first light source 30A can more easily be emitted to the outside of the lightguide plate 20 from the first-A light control groove 231A. This allows for preventing light from the first light source 30A from entering the second light-emitting region R2, so that it is possible to improve the contrast ratio between the first light-emitting region R1 and the second light-emitting region R2. Similarly, with the first-B light control groove 231B, the second-A light control groove 232A and/or the second-B light control groove 232B that are through holes open in the first surface 20A and the second surface 20B, it is possible to improve the contrast ratio between adjacent light-emitting regions.

Figure 4A:
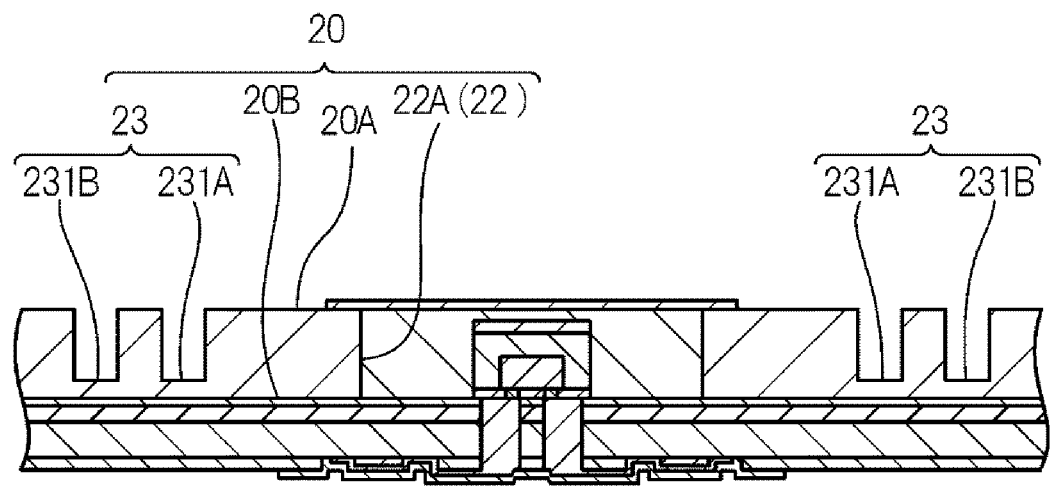
FIG. 4A is a schematic cross-sectional view showing a variant example of the surface light source according to the first embodiment.
Figure 4A:
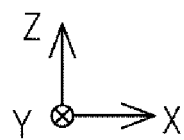

As shown in FIG. 4A, the first-A light control groove 231A and the first-B light control groove 231B may be recesses that are open in the first surface 20A and are apart from the second surface 20B of the lightguide plate 20. Thus, the first light-emitting region R1 and the second light-emitting region R2 are connected to each other by the lightguide plate 20, which allows for increasing the amount of light from the light source that enters the demarcating region S located between the first light-emitting region R1 and the second light-emitting region R2. With this structure, it is possible to prevent the demarcating region from becoming excessively dark. Similarly, the second-A light control groove 232A and the second-B light control groove 232B may be recesses that are open in the first surface 20A and are apart from the second surface 20B of the lightguide plate 20.

Figure 4B:
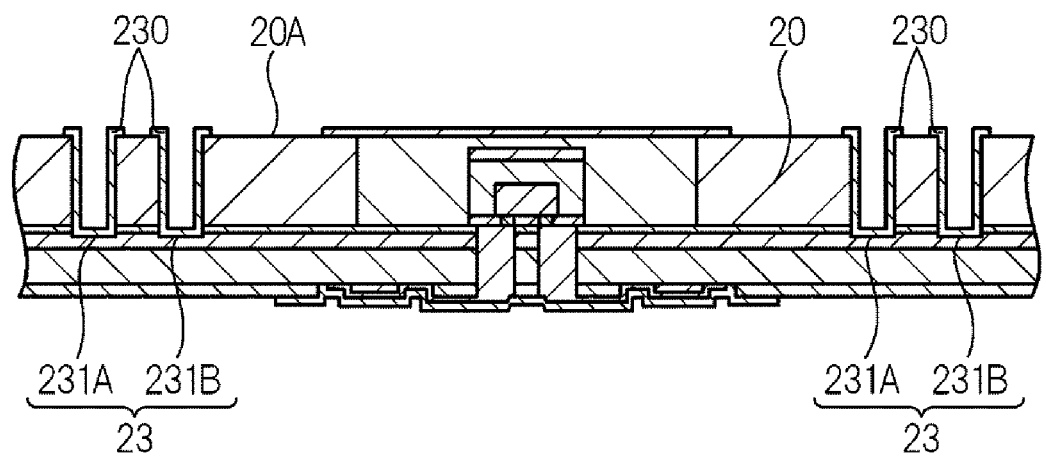
FIG. 4B is a schematic cross-sectional view showing a variant example of the surface light source according to the first embodiment.
Figure 4B:
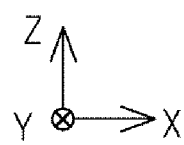

The inside of each light control groove 23 may be an air layer, or a first member 230 comprising or consisting of a light-transmitting material or a light-reflecting material, etc., may be disposed in each light control groove 23 as shown in FIG. 4B. The first member 230 may be disposed in the form of a layer extending along the inner surface defining the light control groove 23 as shown in FIG. 4B, or the first member 230 may fill part or whole of the inside of the light control groove 23. The first member 230 may cover a portion of the first surface 20A of the lightguide plate 20. This allows for improving the adhesion between the first member 230 and the lightguide plate 20.

In the present embodiment, the inside of the light control groove 23 is an air layer. Because the refractive index of the air layer is lower than the refractive index of the lightguide plate 20, light from the light source is more likely to be totally reflected at the interface between the lightguide plate 20 and the air layer. Thus, it is possible to improve the contrast ratio between adjacent light-emitting regions. The first member 230 disposed inside the light control groove 23 may have any appropriate refractive index, but is preferably higher than the refractive index of the lightguide plate 20. With this structure, light from the light source is more likely to be refracted at the interface between the lightguide plate 20 and the first member 230. In particular, when an air layer is located between opposite portions of each first member 230 in the first direction as shown in FIG. 4B, it is preferable that the refractive index of the first member 230 is higher than the refractive index of the lightguide plate 20. With such a reflective index, difference in the refractive index between the first member 230 and the air layer is increased, so that light from the light source is more likely to be totally reflected at the interface between the first member 230 and the air layer. Thus, it is possible to improve the contrast ratio between adjacent light-emitting regions.

When the first member 230 comprises or consists of a light-transmissive material, it is possible to prevent reduction in brightness directly above the light control groove 23. The resin used for the light-transmitting material or the light-reflecting material may be a thermoplastic resin such as an acrylic resin, a polycarbonate resin, a cyclic polyolefin resin, a polyethylene terephthalate resin or a polyester resin, or a thermosetting resin such as an epoxy resin or a silicone resin. The light-transmitting material or the light-reflecting material can contain a light-diffusing material. For, the light-diffusing material, a known material such as titanium oxide, silica, alumina, zinc oxide or glass can be used. Examples of a metal used for the light-reflecting material include platinum (Pt), silver (Ag), rhodium (Rh) or aluminum (Al), for example.

In a top plan view, the first-A light control grooves 231A and the second-A light control grooves 232A may be connected to or spaced apart from the first-B light control grooves 231B and the second-B light control grooves 232B. In the present embodiment, the first-A light control grooves 231A, the second-A light control grooves 232A are connected to the first-B light control grooves 231B and the second-B light control grooves 232B. This structure allows for facilitating improvement in the contrast ratio between adjacent light-emitting regions.

As shown in FIG. 1, it is preferred that one of the first-A light control grooves 231A is located between a first midpoint 221C (which is the midpoint between the central portion of the first light source placement section 22A and the central portion of the second light source placement section 22B) and the central portion of the first light source placement section 22A in the first direction, and located closer to the first midpoint 221C than to the central portion of the first light source placement section 22A in the first direction. With this structure, it is possible to increase the area of the first light-emitting region R1 in the first direction.

In the present specification, "the central portion of a light source placement section" refers to the centroid of the light source placement section 22 in a top plan view. For example, when the light source placement section 22 has a circular shape, the central portion of the light source placement section refers to the center of the circular shape, and when the shape of the light source placement section 22 has a rectangular shape, the central portion of the light source placement section refers to the intersection between the diagonals of the light source placement section.

It is preferred that one of the first-B light control grooves 231B is located between the first midpoint 221C and the central portion of the second light source placement section 22B in the first direction, and located closer to the first midpoint 221C than to the central portion of the second light source placement section 22B in the first direction. With this structure, it is possible to increase the area of the second light-emitting region R2 in the first direction.

It is preferred that one of the second-A light control grooves 232A is located between a second midpoint 222C (which is the midpoint between the central portion of the first light source placement section 22A and the central portion of the third light source placement section 22C) and the central portion of the first light source placement section 22A in the second direction, and located closer to the second midpoint 222C than to the central portion of the first light source placement section 22A in the second direction. With this structure, it is possible to increase the area of the first light-emitting region R1 in the second direction.

It is preferred that one of the second-B light control grooves 232B is located between the second midpoint 222C and the central portion of the third light source placement section 22C in the second direction, and located closer to the second midpoint 222C than to the central portion of the third light source placement section 22C in the second direction. With this structure, it is possible to increase the area of the third light-emitting region R3 in the second direction.

It is preferred that the shortest width of each first-A light control groove 231A and/or the shortest width of each first-B light control groove 231B are shorter than the shortest width of the first light source placement section 22A in the first direction. With this structure, it is easier to increase the size of the first light-emitting region R1 and/or the second light-emitting region R2 in the first direction. In the first direction, the shortest width of each first-A light control groove 231A and/or the shortest width of each first-B light control groove 231B are 0.05 times or more and 0.2 times or less of the shortest width of the first light source placement section 22A, for example. When the shortest width of each first-A light control groove 231A and/or the shortest width of each first-B light control groove 231B are 0.05 times or more of the shortest width of the first light source placement section 22A in the first direction, it is possible to prevent light emitted to the outside of the lightguide plate 20 from the first-A light control groove 231A and/or the first-B light control groove 231B from re-entering the lightguide plate 20. When the shortest width of each first-A light control groove 231A and/or the shortest width of each first-B light control groove 231B are 0.2 times or less of the shortest width of the first light source placement section 22A in the first direction, it is easier to increase the size of the first light-emitting region R1 and/or the second light-emitting region R2 in the first direction. In the first direction, the shortest width W1 of each first-A light control groove 231A and/or the shortest width W2 of each first-B light control groove 231B are 0.1 mm or more and 2 mm or less, for example. In the present specification, the width of a groove means the width of the groove at the opening thereof on the first surface 20A and/or the second surface 20B. With the first-A light control groove 231A in the present embodiment open in the first surface 20A and the second surface 20B, the shortest width of the first-A light control groove 231A refers to the shorter one of the width of the first-A light control groove 231A at the opening thereof in the first surface 20A and the width of the first-A light control groove 231A at the opening thereof in the second surface 20B. In the present specification, the width of a light source placement section refers to the width of the light source placement section at the opening thereof on the first surface 20A and/or the second surface 20B.

It is preferred that the shortest width of each second-A light control groove 232A and/or the shortest width of each second-B light control groove 232B are shorter than the shortest width of the first light source placement section 22A in the second direction. With this structure, it is easier to increase the size of the first light-emitting region R1 and/or the third light-emitting region R3 in the second direction. In the second direction, the shortest width of each second-A light control groove 232A and/or the shortest width of each second-B light control groove 232B are 0.05 times or more and 0.2 times or less of the shortest width of the first light source placement section 22A, for example. In the second direction, the shortest width of each second-A light control groove 232A and/or the shortest width of each second-B light control groove 232B are 0.1 mm or more and 2 mm or less, for example.

It is preferred that the shortest width W1 of each first-A light control groove 231A in the first direction and the shortest width W2 of a corresponding first-B light control groove 231B in the first direction are equal to each other. With this structure, the ratio of light from the light source that is refracted or reflected at the first-A light control groove 231A and the ratio of light from the light source that is refracted or reflected at the first-B light control groove 231B can be easily made generally equal to each other. This allows for facilitating reduction in brightness variation between the first light-emitting region R1 and the second light-emitting region R2. It is preferred that the shortest width of each first-A light control groove 231A in the first direction, the shortest width of each first-B light control groove 231B in the first direction, the shortest width of each second-A light control groove 232A in the second direction, and the shortest width of each second-B light control groove 232B in the second direction are equal to each other. This structure allows for facilitating reduction in brightness variation between the first light-emitting region R1, the second light-emitting region R2 and the third light-emitting region R3. The expression "widths being equal to each other" in the present specification encompass variation within ±5%.

It is preferred that the shortest distance W3 between each first-A light control groove 231A and a corresponding first-B light control groove 231B is equal to or shorter than the shortest width W1 of the respective first-A light control groove 231A in the first direction. With this structure, it is easier to increase the size of the first light-emitting region R1. Similarly, it is preferred that the shortest distance between each second-A light control groove 232A and a corresponding second-B light control groove 232B is equal to or shorter than the shortest width of the respective second-A light control groove 232A in the second direction.

The light source placement section 22 of the lightguide plate 20 is a space for disposing the light source 30. That is, the light source 30 is disposed in the light source placement section 22. The light source placement section 22 may be a through hole that is open in the first surface 20A and the second surface 20B of the lightguide plate 20, or may be a recess that is open in the second surface 20B and is apart from the first surface 20A. When the light source placement section 22 is a through hole that is open in the first surface 20A and the second surface 20B, reduction in the thickness of the lightguide plate 20 in the Z direction can be facilitated, so that it is possible to reduce the thickness of the light-emitting module 100. When the light source placement section 22 is a recess that is open in the second surface 20B and is apart from the first surface 20A, the lightguide plate 20 is located directly above the light source 30. This structure allows for facilitating adjustment of the intensity of light emitted to the outside of the lightguide plate 20 at a portion directly above the light source 30 with the lightguide plate 20. While the light source placement section 22 has a circular shape in a top plan view in the present embodiment, it may have an elliptical shape or a polygonal shape such as a triangular shape, a rectangular shape, a hexagonal shape or an octagonal shape. The width of the light source placement section 22 in the first direction or the second direction is preferably 1.5 mm or more and 15 mm or less, and more preferably 2 mm or more and 6 mm or less, for example. The distance between light source placement sections 22 that are adjacent to each other in the first direction (the X direction) or the second direction (the Y direction) is preferably 1 mm or more and 20 mm or less, and more preferably 4 mm or more and 10 mm or less. As shown in FIG. 2, the two opposing sides of a light source placement section in a cross-sectional view may extend parallel to the Z direction or the two opposing sides of a light source placement section may be inclined with respect to the Z direction. For example, when the opposing two sides of a light source placement section are inclined from the Z direction, the light source placement section in a cross-sectional view may have a V-shape or may have a trapezoidal shape. The outer edge of the light source placement section may be curved in a cross-sectional view.

Figure 5:
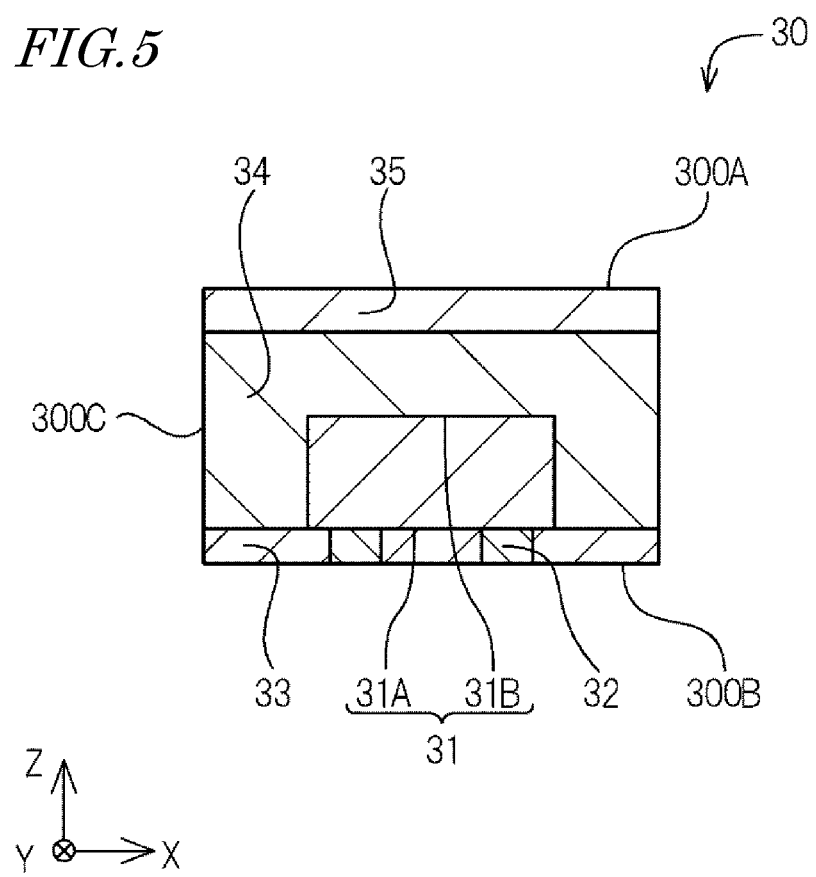
FIG. 5 is a schematic cross-sectional view showing a light source according to the first embodiment.

While a single light source 30 is disposed in a single light source placement section 22 in the present embodiment, two or more light sources 30 may be disposed in the light source placement section 22. As shown in FIG. 5, the light source 30 includes an upper surface 300A, a lower surface 300B and lateral surfaces 300C. The light source 30 in a top plan view has a rectangular shape having four lateral surfaces 300C, for example. As shown in FIG. 1, for example, the sides (the lateral surfaces 300C) of the rectangular shape of the light source 30 in a top plan view are non-parallel to the first direction (the X direction) or the second direction (the Y direction). In a top plan view, the sides (the lateral surfaces 300C) of the rectangular shape of the light source 30 are at an angle of +45 degrees or 135 degrees (−45 degrees) with respect to the first direction (the X direction) or the second direction (the Y direction). With such an arrangement, each of the four lateral surfaces 300C of the light source 30 faces a respective one of the four corners of the light-emitting region in a top plan view, which allows for preventing reduction of the brightness in the vicinity of the four corners of the light-emitting region located farthest from the central portion of the light-emitting region.

The light source 30 may be a light-emitting device or may be a structure including an optical member, such as a wavelength conversion member, combined with a light-emitting device. As will be described as variant examples below, the light source 30 may have various configurations.

As shown in FIG. 5, the light source 30 according to the present embodiment includes a light-emitting device 31, an external electrode member 32, a cover member 33, a second light-transmitting member 34 and a second light control member 35. The light-emitting device 31 includes at least a semiconductor stack body and positive and negative electrodes. The light-emitting device 31 is a light-emitting diode (LED), for example, configured to emit blue light, for example. For example, $In_xAl_yGA_{1-x-y}N$ ($0 \leq x$, $0 \leq y$, $x+y \leq 1$) can be contained to be used for the semiconductor stack body. The light-emitting device 31 has a first surface 31A on which positive and negative electrodes are arranged, and a second surface 31B opposite to the first surface 31A. The cover member 33 may contain or be made of, for example, a resin material containing a light-diffusing material, and covers the first surface 31A of the light-emitting device and the lower surface of the second light-transmitting member 34. More specifically, for the cover member 33, a silicone resin, an epoxy resin, or the like containing titanium oxide, silica, alumina, zinc oxide, glass, or the like serving as the light-diffusing material can be used.

The second light-transmitting member 34 covers the second surface 31B and the lateral surfaces of the light-emitting device 31. For example, a light-transmitting resin material can be used for the second light-transmitting member 34. Examples of the resin material used for the second light-transmitting member 34 include an epoxy resin, a silicone resin, and a resin in which these resins are mixed. The second light-transmitting member 34 may or may not contain a phosphor in the resin material. When the second light-transmitting member 34 contains a phosphor, the second light-transmitting member 34 serves as a wavelength conversion layer.

For the phosphor, a yttrium aluminum garnet-based phosphor (e.g., $Y_3(Al,Ga)_5O_{12}:Ce$), a lutetium aluminum garnet-based phosphor (e.g., $Lu_3(Al,Ga)_5O_{12}:Ce$), a terbium aluminum garnet-based phosphor (e.g., $Tb_3(Al,Ga)_5O_{12}:Ce$), a β-Sialon phosphor (e.g., $(Si,Al)_3(O,N)_4:Eu$), an α-Sialon phosphor (e.g., $M_z(Si,Al)_{12}(O,N)_{16}$ (where $0 \leq z \leq 2$, and M is Li, Mg, Ca, Y and a lanthanide element excluding La and Ce)), a nitride-based phosphor such as a CASN-based phosphor (e.g., $CaAlSiN_3:Eu$) or an SCASN-based phosphor (e.g., $(Sr,Ca)AlSiN_3:Eu$), a fluoride-based phosphor such as a KSF-based phosphor (e.g., $K_2SiF_6:Mn$) or an MGF-based phosphor (e.g., $3.5MgO \cdot 0.5MgF_2 \cdot GeO_2:Mn$), a quantum dot phosphor, or the like can be used.

The second light-transmitting member 34 may include different kinds of phosphors, e.g., a phosphor that absorbs blue light and emits yellow light and a phosphor that absorbs blue light and emits red light, which allow for emitting, for example, white light from the light source 30. The second light-transmitting member 34 may contain a light-diffusing material in such an amount that light is not blocked. The content of the light-diffusing material contained in the second light-transmitting member 34 may be adjusted so that the transmittance of the second light-transmitting member 34 for light emitted from the light-emitting device 31 is 50% or more and 99% or less, and preferably 70% or more and 90% or less. Examples of the light-diffusing material include titanium oxide, silica, alumina, zinc oxide, glass, or the like.

The second light control member 35 is arranged on the upper surface of the second light-transmitting member 34. The second light control member 35 may contain or be made of, for example, a light-reflecting material such as a resin material or a metal material that contains a light-diffusing material. The second light control member 35 may be a distributed bragg reflector (DBR), for example. The second light control member 35 reflects at least a portion of light propagated from the second light-transmitting member 34. The second light control member 35 may allow a portion of light propagated from the second light-transmitting member 34 to pass therethrough. If the transmittance of the second light control member 35 for light coming from the light-emitting device 31 is sufficiently low, e.g., 1% or more and 50% or less, and preferably 3% or more and 30% or less, the second light control member 35 serves as a light-blocking film, and it is possible to prevent the brightness directly above the light source 30 from becoming too high.

As shown in FIG. 2, a first light-transmitting member 25 is arranged in the light source placement section 22, covering the upper surface and the lateral surface of the light source 30. For the first light-transmitting member 25, for example, a light-transmitting resin material may be used. As with the lightguide plate 20, the resin material may be a thermoplastic resin, a thermosetting resin, or the like. The first light-transmitting member may or may not contain a phosphor in the resin material. The first light-transmitting member may or may not contain a light-diffusing material in the resin material.

A first light control member 26 is arranged on the first light-transmitting member 25. The first light-transmitting member 25 may have a circular shape, an elliptical shape or a polygonal shape such as a triangular shape, a rectangular shape, a hexagonal shape or an octagonal shape in a top plan view. The first light-transmitting member 25 in the present embodiment has a rectangular shape with four rounded corners in a top plan view. The first light control member 26 reflects at least a portion of light from the light source 30 that has passed through the first light-transmitting member 25. The first light control member 26 may allow a portion of light propagated from the first light-transmitting member 25 to pass therethrough. The first light control member 26 may contain or be made of a resin material containing a light-diffusing material or may contain or be made of a metal material, for example. For example, a silicone resin, an epoxy resin, a resin in which a silicone resin and an epoxy resin are mixed together, etc., can be used for the resin material. A known material such as titanium oxide, silica, alumina, zinc oxide or glass may be used for the light-diffusing material. A dielectric multi-layer film may be used for the first light control member 26. While the first light control member 26 is a film in the present embodiment, it may have a dotted pattern, for example. While the first light control member 26 in the present embodiment covers the entire upper surface the first light-transmitting member 25 in a top plan view, a portion of the upper surface of the first light-transmitting member 25 may be exposed through the first light control member 26.

Second Embodiment

Next, the second embodiment will be described.

Figure 6:
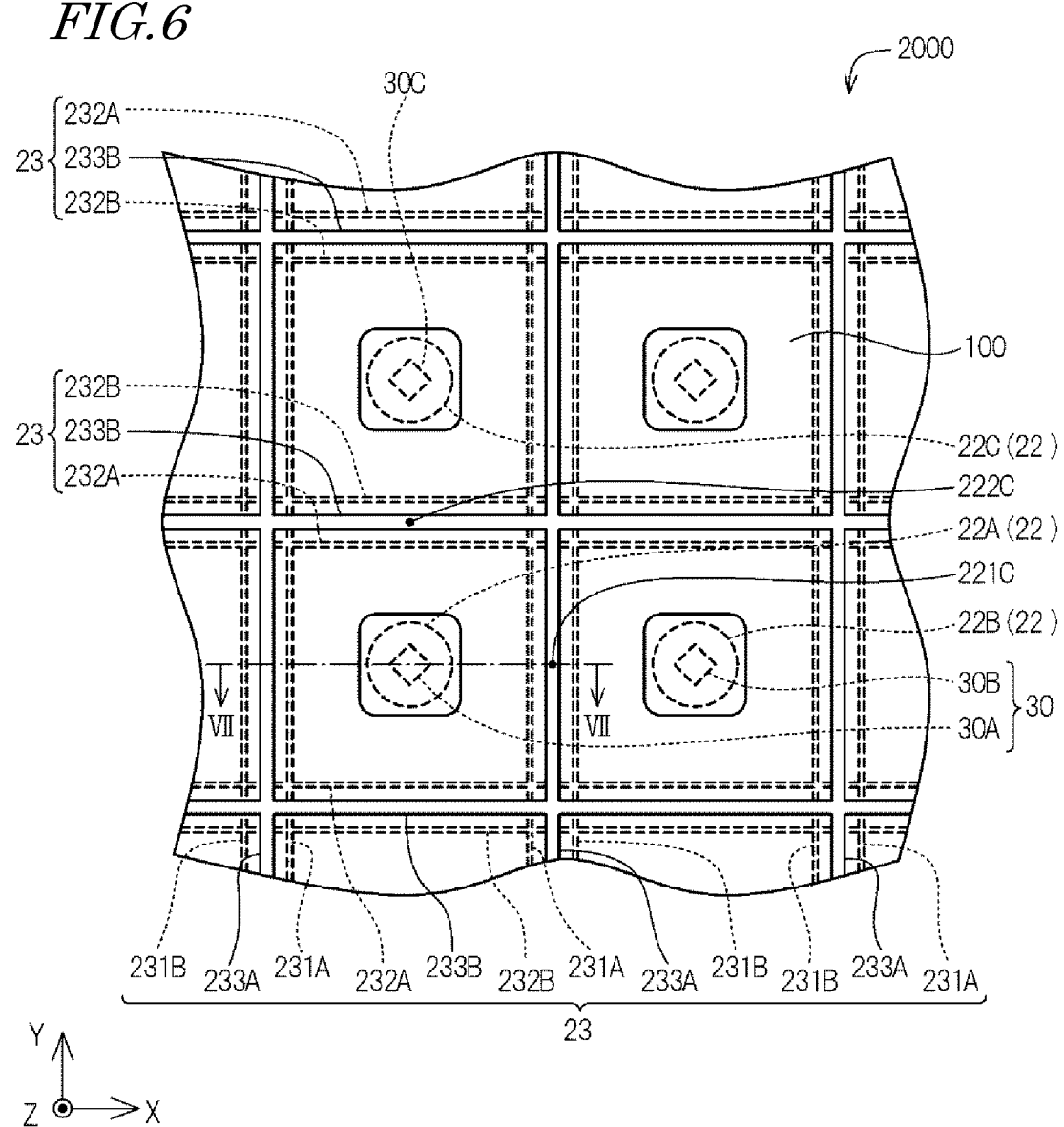
FIG. 6 is a schematic top view showing an example of a surface light source according to a second embodiment of the present disclosure.

As shown in FIG. 6, a surface light source 2000 according to the present embodiment includes a third-A light control groove 233A that is located between the first-A light control groove 231A and the first-B light control groove 231B and extends parallel to the second direction, and a third-B light control groove 233B that is located between the second-A light control groove 232A and the second-B light control groove 232B and extends parallel to the first direction. The first-A light control groove 231A and the first-B light control groove 231B are recesses that are open in the second surface 20B and are apart from the first surface 20A. Other configuration and the advantageous effects of the present embodiment are similar to those of the first embodiment. The light control grooves 23 include first-A light control grooves 231A, first-B light control grooves 231B, second-A light control grooves 232A, second-B light control grooves 232B, third-A light control grooves 233A and third-B light control grooves 233B.

Figure 7:
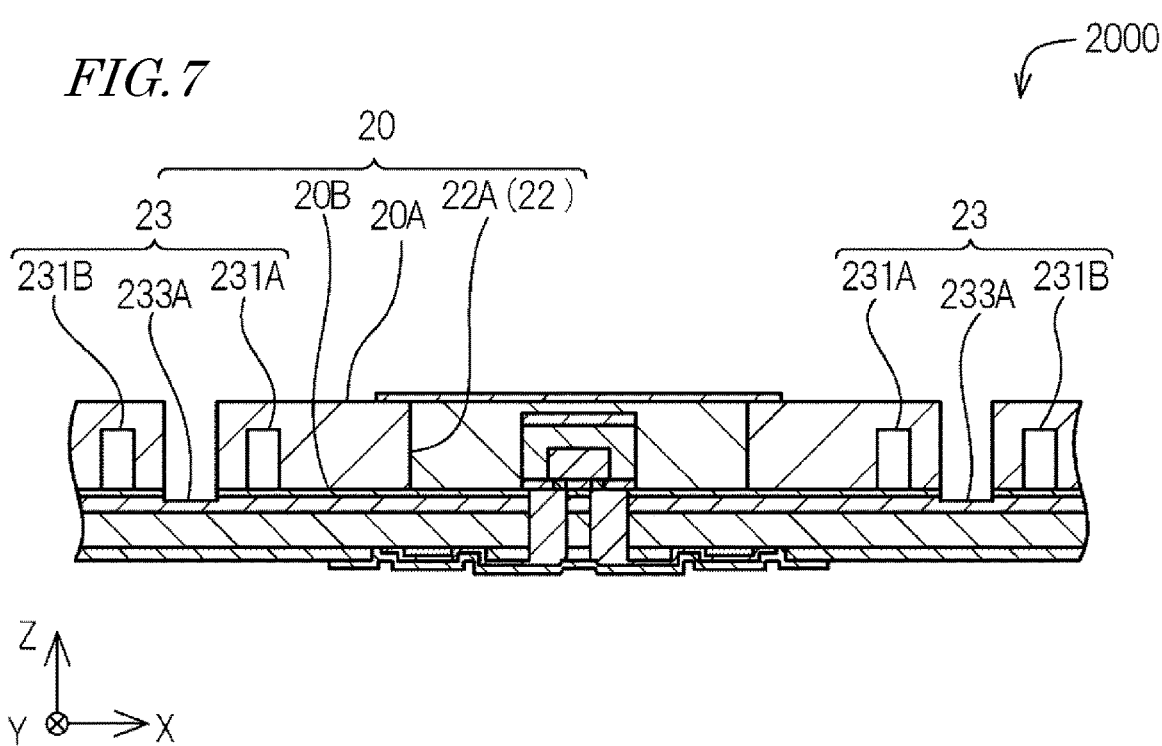
FIG. 7 is a schematic cross-sectional view taken along line VII-VII of FIG. 6, showing the example of the surface light source according to the second embodiment.

Each third-A light control groove 233A and each third-B light control groove 233B may be through holes that are open in the first surface 20A and the second surface 20B, recesses that are open in the second surface 20B and are apart from the first surface 20A, or recesses that are open in the first surface 20A and are apart from the second surface 20B. As shown in FIG. 7, in the present embodiment, the third-A light control grooves 233A and the third-B light control grooves 233B may be through holes that are open in the first surface 20A and the second surface 20B of the lightguide plate 20. With the third-A light control grooves 233A and the third-B light control groove 233B that are through holes, light from the first light source 30A can be easily emitted to the outside of the lightguide plate 20 through the third-A light control groove 233A and/or the third-B light control groove 233B. This allows for reducing light from the first light source 30A from entering the second light-emitting region and/or the third light-emitting region. Therefore, it is possible to improve the contrast ratio between adjacent light-emitting regions.

It is preferred that the third-A light control groove 233A overlaps with the first midpoint 221C in a top plan view. With this structure, the shapes of adjacent light-emitting regions of the lightguide plate 20 can easily be line-symmetric with each other with respect to a line that extends in the second direction passing through the first midpoint 221C. This allows for facilitating reduction in brightness variation between adjacent light-emitting regions. It is preferred that one of the third-B light control grooves 233B overlaps with the second midpoint 222C in a top plan view.

Figure 8:
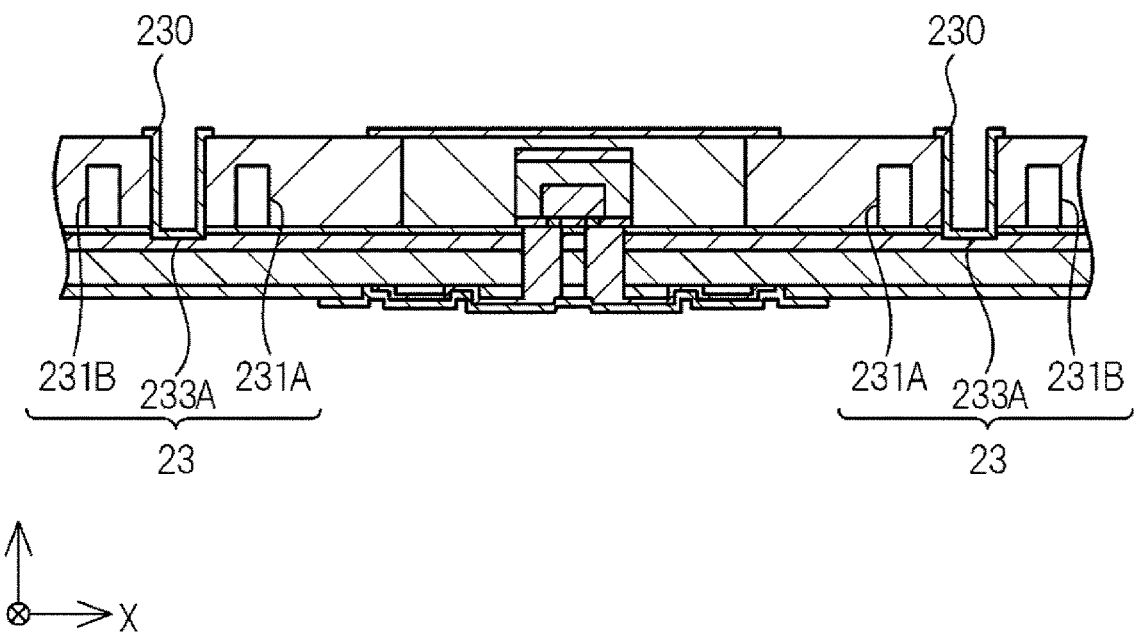
FIG. 8 is a schematic cross-sectional view showing a variant example of the surface light source according to the second embodiment.

The inside of each third-A light control groove 233A and each third-B light control groove 233B may be an air layer, or the first member 230, which may comprise or consist of a light-transmitting material or a light-reflecting material, may be disposed in the third-A light control groove 233A as shown in FIG. 8. It is preferred that a light-reflective first member 230 is disposed in the third-A light control groove 233A and the third-B light control groove 233B. With this structure, it is possible to prevent light from the first light source 30A from entering the second light-emitting region and/or the third light-emitting region, so that it is possible to improve the contrast ratio between adjacent light-emitting regions.

It is preferred that the shortest width of each third-A light control groove 233A is longer than the shortest width of each first-A light control groove 231A and the shortest width of each first-B light control groove 231B in the first direction. With this structure, light from the first light source 30A can more easily be emitted to the outside of the lightguide plate 20 through the third-A light control groove 233A. The shortest width of each third-A light control groove 233A is, for example, twice or more and five times or less of the shortest width of each first-A light control groove 231A in the first direction. It is preferred that the shortest width of each third-B light control groove 233B is longer than the shortest width of each second-A light control groove 232A and the shortest width of each second-B light control groove 232B in the second direction. With this structure, light from the first light source 30A can be easily emitted to the outside of the lightguide plate 20 from a corresponding third-B light control groove 233B. The shortest width of each third-B light control groove 233B is, for example, twice or more and five times or less of the shortest width of each second-A light control groove 232A in the second direction. The shortest width of each first-A light control groove 231A and/or the shortest width of each first-B light control groove 231B are, for example, 0.1 mm or more and 1 mm or less in the first direction. The shortest width of each third-A light control groove 233A is 0.2 mm or more and 2 mm or less, for example, in the first direction. The shortest width of each second-A light control groove 232A and/or the shortest width of each second-B light control groove 232B are 0.1 mm or more and 1 mm or less, for example, in the second direction. The shortest width of each third-B light control groove 233B is 0.2 mm or more and 2 mm or less, for example, in the second direction.

Third Embodiment

Next, the third embodiment will be described.

Figure 9:
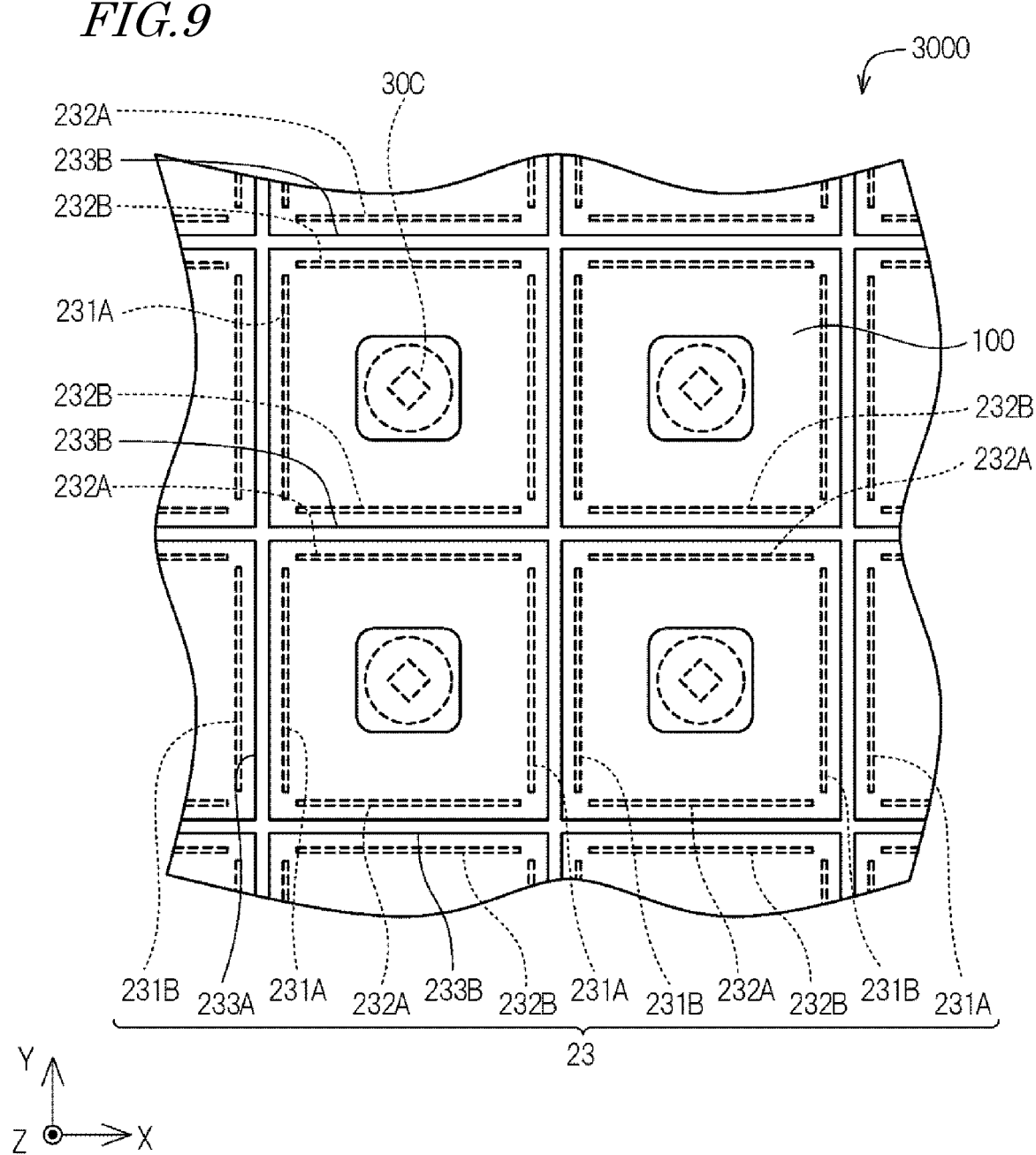
FIG. 9 is a schematic top view showing an example of a surface light source according to a third embodiment of the present disclosure.

As shown in FIG. 9, in a surface light source 3000 according to the present embodiment, the first-A light control groove 231A, the second-A light control groove 232A, the first-B light control groove 231B and the second-B light control groove 232B are spaced apart from each other. Other configurations and the advantageous effects of the present embodiment are similar to those in the second embodiment.

With the first-A light control groove 231A and the second-A light control groove 232A that are spaced apart from each other, light from the first light source can be easily guided to demarcating regions that are located in the vicinity of the corners of the first light-emitting region. Thus, it is possible to prevent the lowering of the brightness in the demarcating regions that are located in the vicinity of the corners of the first light-emitting region R1. Similarly, with the first-B light control groove 231B and the second-A light control groove 232A are spaced apart from each other, it is possible to prevent the lowering of the brightness in the demarcating regions that are located in the vicinity of the corners of the second light-emitting region. With the first-A light control groove 231A and the second-B light control groove 232B that are not connected to each other, it is possible to prevent reduction of the brightness in demarcating regions that are located in the vicinity of the corners of the third light-emitting region.

Variant examples, which are commonly applicable to the embodiments described above, will now be described.

A first variant example to be described below is an example where the wiring board 200 is not employed. Second to fifth variant examples are variant examples of the light source 30. Views showing the variant examples are schematic, and elements therein may be omitted or simplified as needed. The embodiments described above and variant examples thereof to be described below may be used in any combination thereof.

Figure 10:
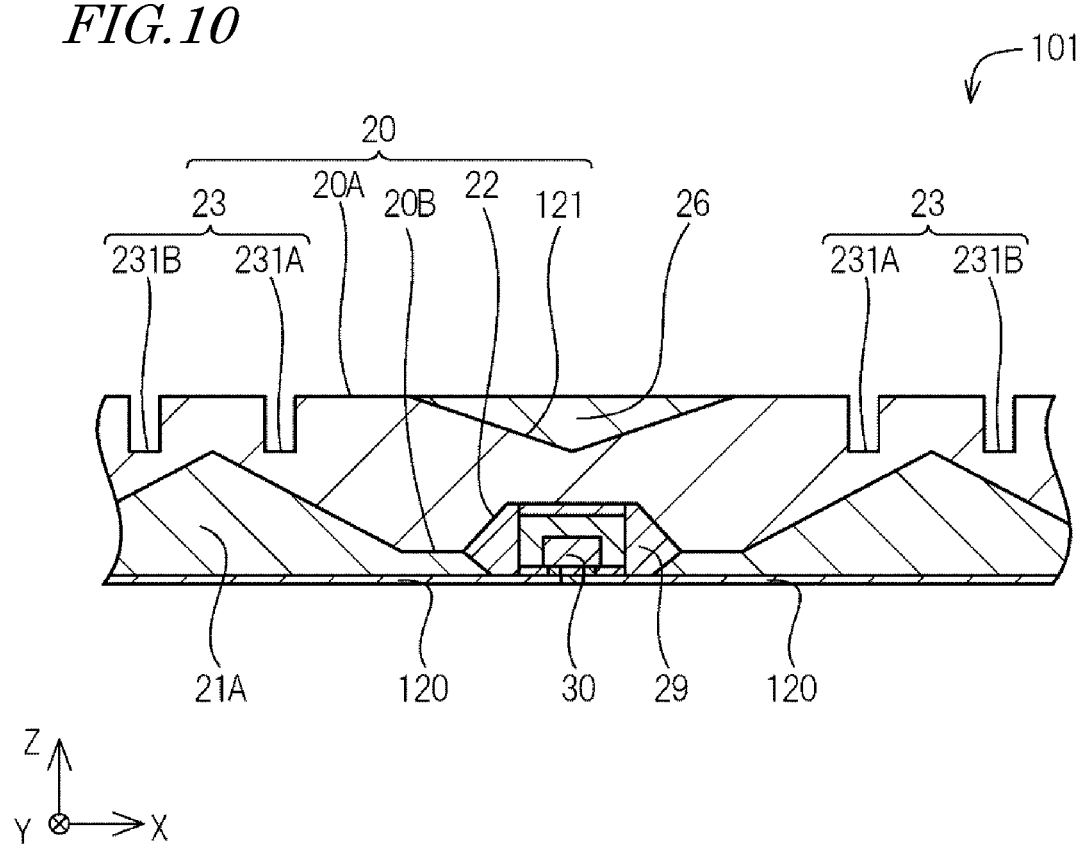
FIG. 10 is a schematic cross-sectional view showing a surface light source according to a first variant example.

As shown in FIG. 10, in a light-emitting module 101 according to the present variant example, the wiring board is not employed. In the lightguide plate 20, the light source placement sections 22 are recesses defined in the second surface 20B of the lightguide plate 20. Each light source 30 is disposed in a corresponding one of the light source placement sections 22, and the space between each light source 30 and the lightguide plate 20 in the light source placement section 22 is filled with the securing member 29. The securing member 29 may contain or be made of, for example, a light-transmitting resin material, for example. Each light source 30 is secured to the lightguide plate 20 via a corresponding securing member 29.

A reflective partition member 21A is disposed at the second surface 20B side of the lightguide plate 20. With the provision of the partition member 21A, it is possible to improve the contrast ratio between adjacent light-emitting regions. The distal portion of the partition member 21A extends in a lattice pattern in the first direction and the second direction, for example. The "distal portion of the partition member 21A" as used herein refers to a portion where the thickness of the partition member 21A in the Z direction is at maximum in a cross-sectional view. A portion of the partition member 21A may be located in the light source placement section 22. Positive and negative wirings 120 are arranged on the lower surface of the partition member 21A. The positive and negative wirings 120 are electrically connected to the light source 30. Recesses 121 are defined in regions of the first surface 20A of the lightguide plate 20 each including a region directly above a respective light source placement section 22. The first light control member 26 may or may not be disposed in the recess 121. The first light control member 26 may have a conical shape or a pyramidal shape.

The light-emitting module 101 according to the present variant example is mounted on an external substrate (not shown), thus forming a surface light source. Then, electric power is supplied to the light source 30 from the external substrate.

Second Variant Example

Figure 11:
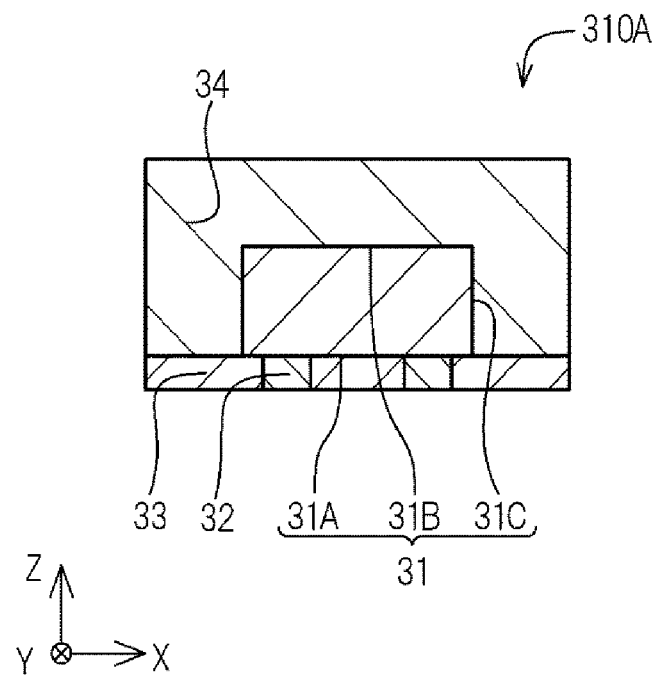
FIG. 11 is a schematic cross-sectional view showing a light source according to a second variant example.

As shown in FIG. 11, a light source 310A according to the present variant example includes the light-emitting device 31, a pair of external electrode members 32, the cover member 33 and the second light-transmitting member 34. The pair of external electrode members 32 are connected to positive and negative electrodes that are arranged on the first surface 31A of the light-emitting device 31. The cover member 33 is disposed below the first surface 31A of the light-emitting device 31 and surrounds the external electrode members 32. The second light-transmitting member 34 covers the second surface 31B and the lateral surfaces 31C of the light-emitting device 31. The second light-transmitting member 34 may or may not contain a phosphor.

Third Variant Example

Figure 12:
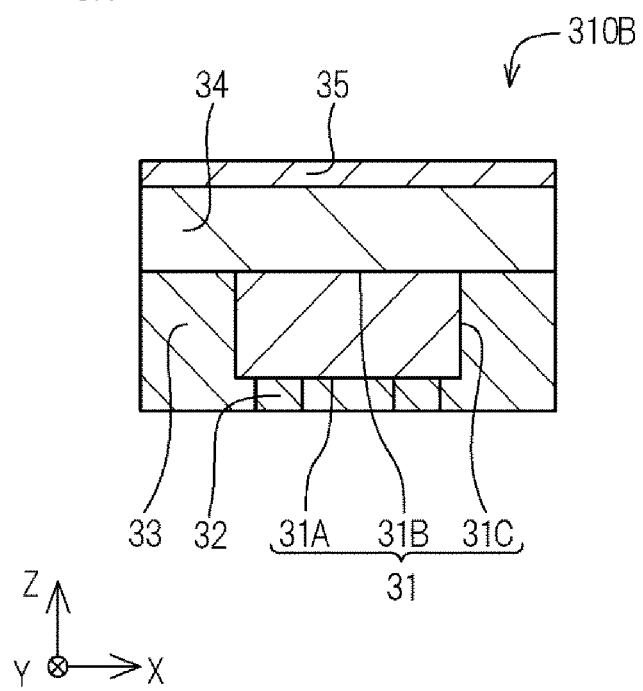
FIG. 12 is a schematic cross-sectional view showing a light source according to a third variant example.

As shown in FIG. 12, a light source 310B according to the present variant example is different from the light source 310A according to the second variant example in that the cover member 33 covers the lateral surfaces 31C of the light-emitting device 31, that the second light-transmitting member 34 is disposed on the second surface 31B of the light-emitting device 31 and that the second light control member 35 is disposed on the second light-transmitting member 34.

Fourth Variant Example

Figure 13:
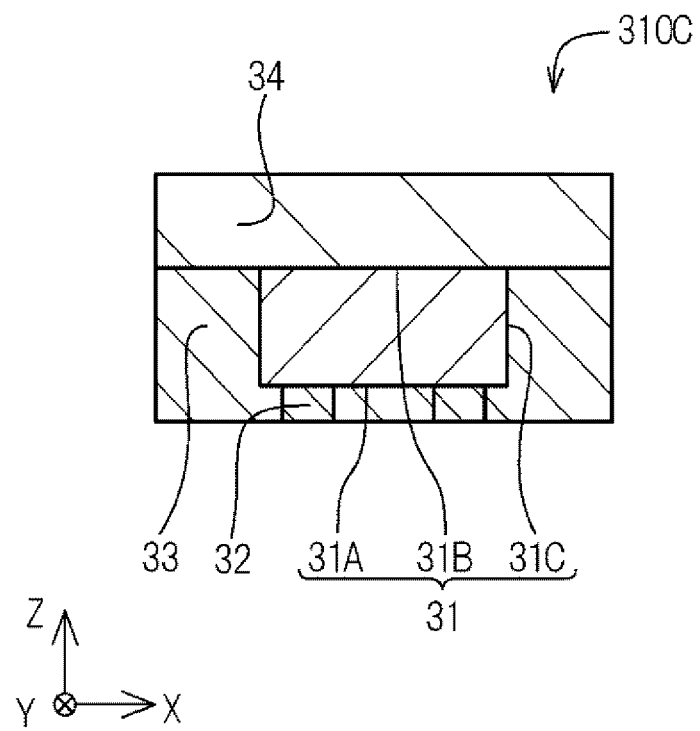
FIG. 13 is a schematic cross-sectional view showing a light source according to a fourth variant example.

As shown in FIG. 13, a light source 310C according to the present variant example is different from the light source 310B according to the third variant example in that the second light control member 35 is not employed.

Fifth Variant Example

Figure 14:
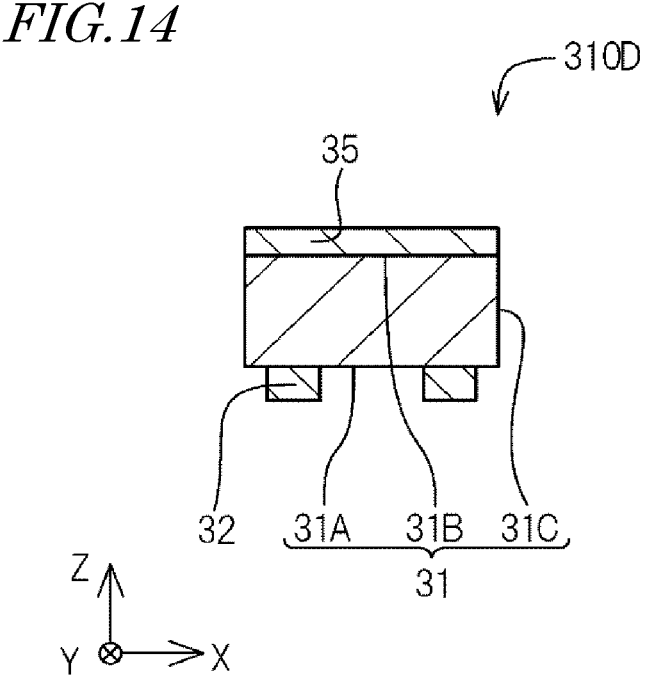
FIG. 14 is a schematic cross-sectional view showing a light source according to a fifth variant example.

As shown in FIG. 14, a light source 310D according to the present variant example is different from the light source 310A according to the second variant example in that the cover member 33 and the second light-transmitting member 34 are not employed and that the second light control member 35 is provided. The second light control member 35 is disposed on the second surface 31B of the light-emitting device 31.

Although examples where the lightguide plate 20 has a plate shape have been described in the embodiments and variant examples thereof described above, other configurations may be alternatively employed, and the lightguide plate 20 may be a layer disposed to cover the light source 30. The lightguide plate 20 may be layered structure of a plurality of layers, or may be a plurality of blocks arranged corresponding to light-emitting regions R. The light source 30 may include a plurality of light-emitting devices. Moreover, the shape of the light-emitting region R is not limited to a rectangular shape, but may be, for example, a polygonal shape other than a rectangular shape such as a triangular shape or a hexagonal shape.

While certain embodiments of the present invention have been described with respect to exemplary embodiments thereof, it will be apparent to those skilled in the art that the disclosed invention can be modified in numerous ways and can assume many embodiments other than those specifically described above. Accordingly, it is intended by the appended claims to cover all modifications of the invention that fall within the true spirit and scope of the invention.

What is claimed is:

1. A light-emitting module comprising:
   a plurality of lightguide members arranged in an array extending in a first direction and in a second direction orthogonal to the first direction, the plurality of lightguide members including:
      a first lightguide member having a first lateral surface extending in parallel to the second direction and a first placement section,
      a second lightguide member having a second lateral surface opposite the first lateral surface of the first lightguide member and a second placement section, and
      a third lightguide member having a third placement section;
   a first light source disposed in the first placement section;
   a second light source disposed in the second placement section; and
   a third light source disposed in the third placement section,
   wherein the second lightguide member is adjacent to the first lightguide member in the first direction, and the third lightguide member is adjacent to the first lightguide member in the second direction;
   wherein the first lightguide member has a first recess extending in parallel to the second direction between the first light source and the second light source.

2. The light-emitting module of claim 1,
   wherein, in the second direction, the first recess is longer in length than the first light source.

3. The light-emitting module of claim 2,
   wherein the first lightguide member further has a second recess extending in parallel to the first direction between the first light source and the third light source.

4. The light-emitting module of claim 3,
   wherein, in the first direction, the second recess is longer in length than the first light source.

5. The light-emitting module of claim 1,
   wherein the first lightguide member further has a second recess extending in parallel to the first direction between the first light source and the third light source.

6. The light-emitting module of claim 5,
   wherein, in the first direction, the second recess is longer in length than the first light source.

7. The light-emitting module of claim 1,
   wherein, in the first direction, a distance from the first light source to the first recess is greater than a distance from the first lateral surface to the first recess.

8. The light-emitting module of claim 7,
   wherein the first recess is not on a first imaginary line that connects the first light source and an end of the first lateral surface in the second direction in a plan view.

9. The light-emitting module of claim 1,
   wherein the first recess is not on a first imaginary line that connects the first light source and an end of the first lateral surface in the second direction in a plan view.

10. The light-emitting module of claim 1,
    wherein, in a cross section taken along the first direction and perpendicularly to the second direction, at least a part of the first recess is located lower than an upper surface of the first light source.

11. The light-emitting module of claim 1, further comprising a first light control member above the first light source,
    wherein the first light control member has a planar area greater than that of the first placement section of the first lightguide member in a plan view.

12. The light-emitting module of claim 11, further comprising a first light-transmitting member that is in contact with both of the first light source and the first light control member.

13. The light-emitting module of claim 11, further comprising a first light-transmitting member that is in contact with both of the first light source and the first light control member,
    wherein, in the second direction, the first recess is longer in length than the first light source.

14. The light-emitting module of claim 11, further comprising a first light-transmitting member that is in contact with both of the first light source and the first light control member,
    wherein the first lightguide member further has a second recess extending in parallel to the first direction between the first light source and the third light source.

15. The light-emitting module of claim 11, further comprising a first light-transmitting member that is in contact with both of the first light source and the first light control member, wherein the first lightguide member further has a second recess extending in parallel to the first direction between the first light source and the third light source, wherein, in the second direction, the first recess is longer in length than the first light source.

16. The light-emitting module of claim 11, further comprising a first light-transmitting member that is in contact with both of the first light source and the first light control member, wherein the first lightguide member further has a second recess extending in parallel to the first direction between the first light source and the third light source, wherein, in the second direction, the first recess is longer in length than the first light source, wherein the first recess is not on a first imaginary line that connects the first light source and an end of the first lateral surface in the second direction in a plan view.

17. The light-emitting module of claim 11, further comprising a first light-transmitting member that is in contact with both of the first light source and the first light control member, wherein, in the second direction, the first recess is longer in length than the first light source, wherein the first recess is not on a first imaginary line that connects the first light source and an end of the first lateral surface in the second direction in a plan view, wherein the first lightguide member further has a second recess extending in parallel to the first direction between the first light source and the third light source, wherein, in the first direction, the second recess is longer in length than the first light source.

18. The light-emitting module of claim 11, further comprising a first light-transmitting member that is in contact with both of the first light source and the first light control member, wherein the first recess is not on a first imaginary line that connects the first light source and an end of the first lateral surface in the second direction in a plan view.

19. The light-emitting module of claim 11, further comprising a first light-transmitting member that is in contact with both of the first light source and the first light control member, wherein the first recess is not on a first imaginary line that connects the first light source and an end of the first lateral surface in the second direction in a plan view, wherein, in the second direction, the first recess is longer in length than the first light source.

* * * * *